United States Patent
Kloiber et al.

(10) Patent No.: US 9,370,887 B2
(45) Date of Patent: Jun. 21, 2016

(54) SENSING DEVICE FOR DETECTING A PHYSICAL QUANTITY AND METHOD FOR PRODUCING SAID SENSOR

(75) Inventors: Gerald Kloiber, Feldkirchen (AT); Heinz Strallhofer, Deutschlandsberg (AT)

(73) Assignee: EPCOS AG, Munich (DE)

( * ) Notice: Subject to any disclaimer, the term of this patent is extended or adjusted under 35 U.S.C. 154(b) by 602 days.

(21) Appl. No.: 12/922,246

(22) PCT Filed: Mar. 9, 2009

(86) PCT No.: PCT/EP2009/052724
§ 371 (c)(1),
(2), (4) Date: Oct. 19, 2010

(87) PCT Pub. No.: WO2009/112457
PCT Pub. Date: Sep. 17, 2009

(65) Prior Publication Data
US 2011/0044375 A1    Feb. 24, 2011

(30) Foreign Application Priority Data

Mar. 13, 2008 (DE) .......................... 10 2008 014 091
Jun. 19, 2008 (DE) .......................... 10 2008 029 192

(51) Int. Cl.
*G01K 1/14*    (2006.01)
*G01D 11/24*    (2006.01)
(Continued)

(52) U.S. Cl.
CPC ..... *B29C 45/14377* (2013.01); *B29C 45/14639* (2013.01); *G01D 11/245* (2013.01);
(Continued)

(58) Field of Classification Search
CPC ..... G01D 11/245; G01K 13/02; G01K 1/026; G01K 1/10; G01K 2013/024; G01K 2205/04; G01K 3/08; G01K 3/10; G01K 7/22; G01L 19/0069; G01L 19/141; G06T 5/002
USPC .............. 374/163, 179, 185, 208, 100, 141; 338/22 R, 25, 28; 73/866.5; 702/130; 264/40.5; 425/170
See application file for complete search history.

(56) References Cited

U.S. PATENT DOCUMENTS 4,179,309 A * 12/1979 Hance et al. .................. 136/234
4,246,786 A * 1/1981 Wiemer et al. ................ 374/165
(Continued)

FOREIGN PATENT DOCUMENTS

DE    25 35 265    2/1977
DE    42 28 888    3/1994
(Continued)

OTHER PUBLICATIONS

English translation of the Written Opinion for corresponding application No. PCT/EP2009/052724.
(Continued)

*Primary Examiner* — Gail Kaplan Verbitsky
(74) *Attorney, Agent, or Firm* — Fish & Richardson P.C.

(57) ABSTRACT

A sensing device for detecting a physical quantity includes a molded part and a sensor element in the molded part. The sensor element includes an enclosure that is formed from the molded part and an injection-molding compound. A connection element may be connected to the sensor element. An interface may be between the sensor element and the connection element.

12 Claims, 1 Drawing Sheet

(51) Int. Cl.
*B29C 45/14* (2006.01)
*B29C 45/00* (2006.01)
*B29C 45/27* (2006.01)

(52) U.S. Cl.
CPC ....... *B29C45/0046* (2013.01); *B29C 45/14426* (2013.01); *B29C 45/14836* (2013.01); *B29C 45/2708* (2013.01)

(56) References Cited

U.S. PATENT DOCUMENTS

| | | | | |
|---|---|---|---|---|
| 4,291,576 | A * | 9/1981 | Deane | 374/155 |
| 4,418,329 | A * | 11/1983 | Gruner | G01K 7/183 338/25 |
| 4,437,084 | A * | 3/1984 | Clayton, Jr. | G01K 7/22 338/22 R |
| 4,630,477 | A * | 12/1986 | Murtland, Jr. | G01F 23/246 338/28 |
| 4,685,464 | A * | 8/1987 | Goldberger et al. | 600/344 |
| 4,729,672 | A * | 3/1988 | Takagi | 374/208 |
| 4,841,274 | A * | 6/1989 | Yagher, Jr. | G01K 7/22 338/22 R |
| 5,046,857 | A * | 9/1991 | Metzger et al. | 374/135 |
| 5,449,234 | A * | 9/1995 | Gipp et al. | 374/185 |
| 5,533,404 | A * | 7/1996 | Wurst et al. | 73/756 |
| 5,679,976 | A * | 10/1997 | Nishikawa et al. | 257/690 |
| 5,749,656 | A * | 5/1998 | Boehm | H01R 13/405 338/28 |
| 5,753,835 | A * | 5/1998 | Gustin | 73/866.5 |
| 5,844,135 | A * | 12/1998 | Brammer | G01K 13/02 374/E1.011 |
| 5,990,779 | A * | 11/1999 | Katsuki et al. | 338/232 |
| 6,034,421 | A * | 3/2000 | Tokunaga | 257/666 |
| 6,151,974 | A | 11/2000 | Acht et al. | |
| 6,155,114 | A | 12/2000 | Karino et al. | |
| 6,157,186 | A | 12/2000 | Aoki et al. | |
| 6,158,886 | A * | 12/2000 | Dutcher et al. | 374/179 |
| 6,297,723 | B1 * | 10/2001 | Shoji et al. | 338/28 |
| 6,334,361 | B1 | 1/2002 | De Volder et al. | |
| 6,536,950 | B1 * | 3/2003 | Green et al. | 374/179 |
| 6,588,931 | B2 * | 7/2003 | Betzner et al. | 374/185 |
| 6,737,952 | B2 * | 5/2004 | Morin | H01H 37/32 337/12 |
| 6,906,611 | B2 | 6/2005 | Schrank et al. | 338/273 |
| 6,918,696 | B2 * | 7/2005 | Hoshisashi et al. | 374/208 |
| 7,004,042 | B2 | 2/2006 | Grundmann et al. | 73/866.5 |
| 7,017,434 | B2 | 3/2006 | Grundmann et al. | 73/866.5 |
| 7,134,345 | B2 * | 11/2006 | Kaiser et al. | 73/715 |
| 7,147,369 | B2 * | 12/2006 | Gadonniex et al. | 374/208 |
| 7,215,236 | B2 | 5/2007 | Rosc et al. | 338/22 R |
| 7,311,014 | B2 | 12/2007 | Fischer et al. | 73/866.1 |
| 7,410,294 | B2 * | 8/2008 | Shiraki et al. | 374/208 |
| 7,517,145 | B2 * | 4/2009 | Seo et al. | 374/147 |
| 7,524,337 | B2 | 4/2009 | Rosc et al. | 29/25.03 |
| 7,642,493 | B2 | 1/2010 | Balzer et al. | 250/203.3 |
| 7,749,797 | B2 * | 7/2010 | Bauer et al. | 438/64 |
| 7,798,704 | B2 | 9/2010 | Bard et al. | 374/115 |
| 7,824,101 | B2 | 11/2010 | Kloiber et al. | 374/147 |
| 7,906,751 | B2 | 3/2011 | Kubiak et al. | 250/203.4 |
| 7,967,505 | B2 | 6/2011 | Matias et al. | 374/183 |
| 7,985,021 | B2 | 7/2011 | Bard et al. | 374/138 |
| 8,059,947 | B2 * | 11/2011 | Bradley | A61M 16/16 374/208 |
| 8,134,446 | B2 | 3/2012 | Kloiber et al. | 338/28 |
| 8,177,179 | B2 | 5/2012 | Bard et al. | 248/222.12 |
| 8,177,425 | B2 | 5/2012 | Grundmann et al. | 374/147 |
| 8,228,160 | B2 | 7/2012 | Kloiber et al. | 338/22 R |
| 8,496,377 | B2 * | 7/2013 | Harr et al. | 374/163 |
| 8,753,553 | B2 * | 6/2014 | Kazmer et al. | 264/40.1 |
| 2001/0009059 | A1 * | 7/2001 | Chiku et al. | 29/450 |
| 2002/0071475 | A1 * | 6/2002 | Betzner | G01K 7/22 374/185 |
| 2003/0128098 | A1 * | 7/2003 | Lavenuta | 338/22 SD |
| 2004/0118227 | A1 | 6/2004 | Tokunaga et al. | |
| 2004/0141545 | A1 * | 7/2004 | Hoshisashi | G01K 13/02 374/208 |
| 2005/0207473 | A1 * | 9/2005 | Philip et al. | 374/185 |
| 2005/0226308 | A1 * | 10/2005 | Hudson | 374/152 |
| 2006/0171127 | A1 | 8/2006 | Kadoya et al. | |
| 2006/0215731 | A1 * | 9/2006 | Gadonniex | G01K 1/16 374/208 |
| 2007/0110124 | A1 * | 5/2007 | Shiraki | G01K 1/08 374/208 |
| 2007/0121701 | A1 * | 5/2007 | Gennissen et al. | 374/143 |
| 2007/0207644 | A1 | 9/2007 | Pollmann et al. | |
| 2007/0216105 | A1 * | 9/2007 | Fessele et al. | 277/318 |
| 2008/0178681 | A1 * | 7/2008 | Asada et al. | 73/754 |
| 2009/0110029 | A1 * | 4/2009 | Bradley et al. | 374/208 |
| 2009/0168839 | A1 * | 7/2009 | Park | G01K 13/02 374/165 |
| 2010/0064788 | A1 * | 3/2010 | Hofler et al. | 73/121 |
| 2010/0195696 | A1 * | 8/2010 | Ishikawa et al. | 374/100 |
| 2012/0043131 | A1 * | 2/2012 | Christov et al. | 174/521 |
| 2012/0057617 | A1 * | 3/2012 | Bohl et al. | 374/208 |
| 2013/0047736 | A1 * | 2/2013 | Papadeas et al. | 73/714 |
| 2014/0016672 | A1 * | 1/2014 | Niemann et al. | 374/208 |
| 2014/0153612 | A1 * | 6/2014 | Yonekura | 374/179 |

FOREIGN PATENT DOCUMENTS

| | | | |
|---|---|---|---|
| DE | 44 23 985 | 1/1996 | |
| DE | 196 29 963 | 1/1998 | |
| DE | 299 07 642 | 10/2000 | |
| DE | 103 60 542 | 7/2005 | |
| EP | 0 712 709 | 5/1996 | |
| EP | 1 221 601 | 7/2002 | |
| EP | 1 262 779 | 12/2002 | |
| EP | 1 830 619 | 9/2007 | |
| FR | 2 864 700 | 7/2005 | |
| JP | 05-208423 | 8/1993 | |
| JP | 05208423 A * | 8/1993 | |
| JP | 09-027401 | 1/1997 | H01C 7/02 |
| JP | 09027401 A * | 1/1997 | |
| JP | 11-186304 | 7/1999 | |
| JP | 2008-108801 | 5/2008 | H01C 7/04 |
| JP | 2008108801 A * | 5/2008 | |
| WO | WO 8808964 A1 * | 11/1988 | |

OTHER PUBLICATIONS

International Search Report and Written Opinion for corresponding application PCT/EP2009/052724.
Machine Translation of Japanese Patent No. JP05-208423.
Machine Translation of Japanese Patent No. JP09-027401.
Machine Translation of Japanese Patent No. JP2008-108801.

* cited by examiner

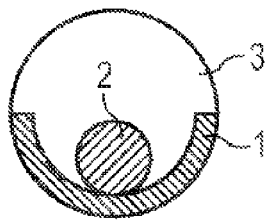
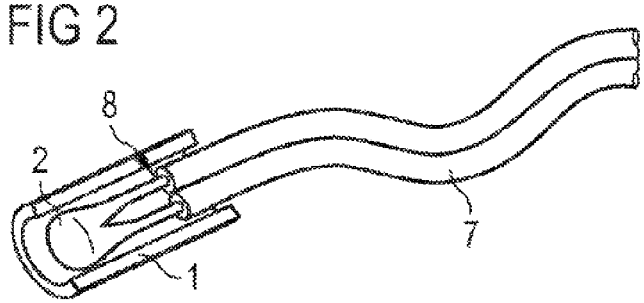
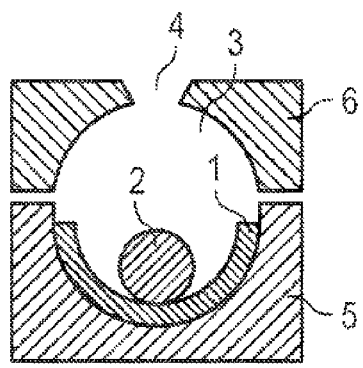 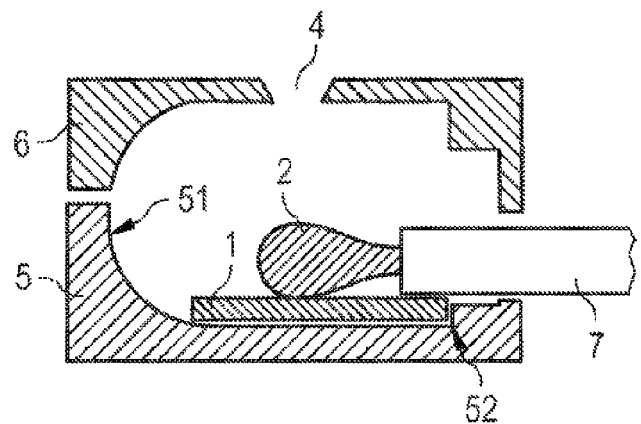
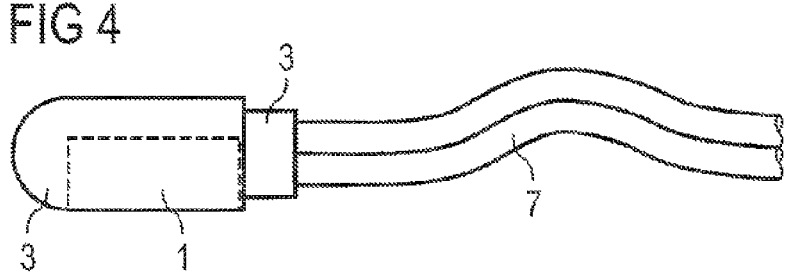

SENSING DEVICE FOR DETECTING A PHYSICAL QUANTITY AND METHOD FOR PRODUCING SAID SENSOR

TECHNICAL FIELD

This patent application relates to a sensing device for detecting a physical quantity, for example for detecting temperature. Furthermore, this patent application relates to a method for producing the sensing device.

BACKGROUND

DE 4423985 A1 discloses a method for producing a temperature sensor.

SUMMARY

A sensing device for detecting a physical quantity includes sensor element with an enclosure. The enclosure is formed by a molded part and an injection-molding compound. The sensor element is inserted in the molded part and overmolded with the injection-molding compound, so that the molded part is form-closed connected to the injection-molding compound.

This includes the case where the sensor element is not overmolded with the injection-molding compound over its entire surface. For example, the sensor element may lie with part of its surface against the molded part and not be surrounded here by injection-molding compound. Similarly included is a case where the molded part is not overmolded with the injection-molding compound over its entire surface but parts of the surface of the molded part are exposed, and consequently form part of the outer contour of the sensing device.

The enclosure may abut the sensor element with form-closure over the entire surface of the sensor element. It is possible here for parts of the enclosure to be formed by the injection-molding compound and parts of the enclosure to be formed by the molded part. The enclosure should surround the sensor element free from gaps. In particular, there should not be any gaps between the enclosure and the sensor element. The presence of gaps may make it more difficult or impossible for the physical quantity to be sensed correctly. For example, gaps may cause an uneven temperature distribution at the surface of the sensor element, with the result that a temperature sensing device cannot detect the temperature correctly.

In an embodiment, the sensor element is suitable for detecting the humidity or the temperature of the surroundings. For example, the sensor element may be an NTC thermistor or else a PTC thermistor.

An enclosure of the sensor element is for encapsulating and protecting the sensor element from environmental influences and mechanical loading. In particular, it is advantageous if the enclosure protects the sensor element or further component parts of the sensing device from penetrating water or penetrating moisture.

The sensor element may be configured via connection elements in such a way that it can be electrically contacted from the outside. For example, the electrical resistance of the sensor element may be measured via the connection elements, which in the case of NTC sensors or else PTC sensors allows the temperature of the sensor element to be directly deduced.

The sensor element may be configured as a wired and enclosed component. The sensor element may be fastened to connection elements, for example leads, by soldering, welding or other suitable methods.

The connection elements may be flexible cables with single insulation or flexible cables with double insulation.

If the sensing device has connection elements, at least the region of the interface between the connection elements and the sensor element is inserted in the molded part and overmolded with injection-molding compound. Also included here is the case where this region is not completely surrounded by injection-molding compound but has an enclosure which is formed by the molded part and the injection-molding compound.

The injection-molding compound may be applied via injection-molding technology. This allows a moisture-proof connection to be produced, for example between the connection elements and the sensor element of the sensing device.

The molded part may be configured in such a way that it bounds a cavity in which the sensor element is inserted. For example, the molded part may be configured in the form of a cylindrical sleeve. In addition, however, it is also possible to configure the molded part in the form of a half shell or a ¾-circular shell. Ultimately, any form into which the sensor element can be pushed or inserted is suitable for the molded part.

In an embodiment of the sensing device, the sensor element lies with its surface against the molded part in such a way that the sensor element touches the surface of the molded part.

According to another embodiment, the sensor element may, however, also be spaced apart from the surface of the molded part.

In this case, the intermediate space is, for example, filled with injection-molding compound or represents an air gap.

The material of the molded part may be chosen such that it is the same material as the injection-molding compound.

In addition, a method for producing the sensing device is provided.

In the case of a method for producing the sensing device, the sensor element is inserted into the molded part. This is followed by the positioning of this arrangement comprising the sensor element and the molded part in the injection mold. Subsequently, injection-molding compound is injected into the injection mold, so that the sensor element is at least partially enclosed by the injection-molding compound.

The sensor element may be already connected to the connection leads before it is inserted into the molded part. In this case, it is advantageous if at least the region of the interface between the sensor element and the connection lead is inserted into the molded part.

After the injection mold and the injection-molding compound have cooled down, demolding may take place, and the product thus obtained may optionally be processed further to form a finished sensing device.

A two-part injection mold, comprising a lower mold and an upper mold, may be used for the overmolding. For example, the sensor element may be inserted together with the molded part into the lower mold, with the result that the molded part rests on the bottom of the lower mold and the sensor element rests on the upper side of the molded part. The injection of the injection-molding compound may then take place from the side of the upper mold. For this purpose, the injection point may be chosen such that the sensor element is pressed against the molded part, and indirectly against the lower mold, by the injection-molding compound flowing in.

With the aid of the molded part, it is possible to achieve the effect that the minimum thickness of the enclosure of the sensing device is equal to the thickness of the molded part. This allows damage caused by environmental influences to be reduced.

The upper distance between the sensor element and the outer side of the enclosure can be achieved by an appropriate choice of the dimensions of the upper mold.

The molded part may represent part of the outer contour of the sensing device after completion of the injection-molding operation.

The molded part may be used as an insert, that is to say first the molded part is inserted into the lower mold and only then is the sensor element inserted into the molded part.

The molded part may also be used as a centering aid, in that it is ensured by a suitable arrangement within the injection mold together with a suitable choice of the position of the injection point that slipping of the sensor element in the interior of the injection mold is prevented during the injection of the injection-molding compound into the injection mold. In particular, the sensor element can be prevented from being forced to the periphery of the injection mold, which would lead to inadmissibly thin enclosures on the outer side of the sensor element.

The injection point during the injection-molding process may be chosen such that the sensor element is pressed against the molded part and thus remains in a stable position, the molded part being shaped such that a stable equilibrium can be achieved.

In an embodiment, the injection mold is shaped such that, after the insertion of the molded part, the outer side of the molded part lies against the injection mold with form-closure. For example, a lower mold of the injection mold is configured as a half shell and has dimensions such that the molded part can be inserted in it with form-closure. In one embodiment, the molded part lies against the injection mold in such a way that it is thereby fixed in a direction transversely to its longitudinal axis.

As an alternative or in addition to this, the injection mold may have step-shaped depressions into which the molded part can be inserted. This is likewise intended to prevent slipping of the molded part in the injection mold. For example, the step-shaped depressions are arranged in a lower mold in such a way that the molded part cannot slip along its longitudinal axis.

The fixing of the molded part in the injection mold and the centering of the sensor element in the molded part make it possible to ensure that the sensor element does not slip in the injection mold during the injection-molding operation.

Through the method described, the thickness of the enclosure can be dependably set. In particular, it is not necessary to apply further enclosing layers, as is carried out in a multi-stage injection-molding process, in order to ensure the minimum thickness of the enclosure at all points. The method described consequently makes it possible for the sensing device to be miniaturized.

The sensing device and the method for producing the sensing device are explained in more detail below on the basis of exemplary embodiments and the associated figures.

DESCRIPTION OF THE DRAWINGS

FIG. 1 shows a sensing device in a schematic cross section perpendicular to the longitudinal axis of the molded part.

FIG. 2 shows a sensor element in a perspective view.

FIG. 3A shows an injection-molding process for the production of the sensing device in a cross section perpendicular to the longitudinal axis of the molded part.

FIG. 3B shows an injection-molding process for producing the sensor in a cross section along the longitudinal axis of the molded part.

FIG. 4 shows a finished sensing device.

DETAILED DESCRIPTION

FIG. 1 shows a sensor element 2, which is inserted in a molded part 1. The sensor element 2 has an enclosure, which is formed by the molded part 1 and by the injection-molding compound 3. The sensor element 2 rests on the molded part 1 and is surrounded by the enclosure with form-closure over its entire surface. The enclosure consequently surrounds the sensor 2 without any gap. The outer side of the molded part 1 is in this case not enclosed by injection-molding compound and thus forms part of the outer contour of the sensing device that is formed by the sensor element 2, the molded part 1 and the injection-molding compound 3. The minimum thickness of the enclosure corresponds to the thickness of the molded part 1.

FIG. 2 shows a ¾-shell-shaped molded part 1, which is used as an insert. The sensor element 2 is already connected to a connection element 7 before insertion into the molded part 1. The sensor element 2 is inserted into the molded part 1 in such a way that, in particular, the interface 8 between the sensor element 2 and the connection element 7 is embedded in the molded part 1 and, after the injection-molding operation, has an enclosure that is formed by the injection-molding compound and by the molded part.

FIG. 3A shows the injection-molding operation for producing the sensing device. A lower mold 5, into which the molded part 1 is inserted, is provided. The inner side of the lower mold 5 is shaped such that the molded part 1 lies with its outer side against the lower mold 5 with form-closure. The contact with form-closure has the effect of preventing slipping transversely with respect to the longitudinal axis of the molded part 1 in the lower mold 5.

The sensor element 2 is inserted into the cavity formed by the molded part 1. Suitably arranging the upper mold 6 achieves the effect of forming an injection mold, with an injection point 4 through which the injection-molding compound 3 is injected into the injection mold 5, 6 being provided in the upper mold 6. Suitable choice of the injection mold and of the molded part together with choice of the position of the injection point can achieve the effect that, when the injection-molding compound is being injected, the sensor element does not slip laterally or toward the front or rear. In this way, a defined separation between the sensor element and the outer side of the sensing device can be ensured.

FIG. 3B shows an injection-molding operation for producing the sensing device in a cross section along the longitudinal axis of the molded part. The injection mold 5, 6 has a rounded head end 51, whereby slipping of the molded part 1 toward the front, i.e. in the direction of this head end 51, is prevented. In this way it is intended to achieve the effect that the sensor element 2 is enclosed at its head end with injection-molding compound 3. The inserting position of the molded part 1 is additionally defined by small steps 52 in the diameter of the lower mold 5. As a result, slipping of the molded part 1 toward the rear is prevented. The molded part 1 is consequently fixed in the injection mold 5, 6 along the longitudinal axis of the molded part 1.

The injection mold 5, 6 does not have to have all the features shown here. For example, the fixing of the molded part 1 in the axial direction may also be achieved only by a rounded head end or by a suitable choice of the position of the injection point.

FIG. 4 shows a finished sensing device, which has been produced for example via the injection-molding process represented in FIGS. 3A and 3B. The mounted part 1 forms part of the outer contour of the sensing device. Since the molded part and the injection-molding compound 3 are formed from the same material, the molded part 1 is not visually set apart from the injection-molding compound 3, and is therefore only depicted by dashed lines. The sensing device has a rounded head end, which is formed by injection-molding compound 3. The rounded head end results from the inner shape of the injection mold 5, 6 that is used. Furthermore, the sensing device has a step-shaped contour. This contour is obtained from a corresponding step in the injection mold 5, 6.

In addition, however, it is also possible to configure the molded part in such a way that the length of the molded part is identical to the length of the finished sensing device, that is to say that the molded part extends over the entire length of the body formed by the injection-molding compound 3.

The invention claimed is:

1. A sensing device for detecting a physical quantity, the sensing device comprising:
    a molded part;
    a sensor element in the molded part;
    an enclosure comprised of the molded part and an injection-molding compound;
    a connection element connected to the sensor element; and
    an interface between the sensor element and the connection element, the interface being in the molded part;
    wherein the sensor element, within the enclosure, directly abuts the molded part and directly abuts the injection-molding compound;
    wherein the molded part comprises a first part of an outer contour of the sensing device and the injection-molding compound comprises a second part of the outer contour of the sensing device,
    wherein the molded part and the injection-molding compound comprise a same material.

2. The sensing device of claim 1, wherein the molded part comprises part of a tube, a tubular half shell, or a ¾-circular shell.

3. The sensing device of claim 1, wherein the molded part comprises an opening for receiving the sensor element.

4. The sensing device of claim 1, wherein the enclosure encloses an entire surface of the sensor element.

5. A method for producing a sensing device, the method comprising:
    inserting a molded part into an injection mold;
    inserting a sensor element into the molded part; and
    injecting an injection-molding compound into the injection mold thereby forming an enclosure for the sensor element, the method being performed so that the sensor element, within the enclosure, directly abuts both the molded part and directly abuts the injection-molding compound, and so that the molded part comprises a first part of an outer contour of the sensing device and the injection-molding compound comprises a second part of the outer contour of the sensing device;
    wherein the sensor element is connected to a connection element via an interface;
    wherein the sensor element is inserted into the molded part so that the interface is in the molded part; and
    wherein the molded part and the injection-molding compound comprise a same material.

6. The method of claim 5, wherein the injection mold is configured so that the molded part is placed, at least in one direction, in the injection mold.

7. The method of claim 6, wherein the injection mold is configured so that the molded part is within the injection mold.

8. The method of claim 6, wherein the injection mold comprises a step-shaped depression for receiving the molded part.

9. The method of claim 6, wherein the injection mold comprises a rounded head end.

10. The method of claim 5, wherein the sensor element presses against the molded part during injection of the injection-molding compound.

11. A method for producing a sensing device, the method comprising:
    inserting a molded part into an injection mold;
    inserting a sensor element into the molded part;
    injecting an injection-molding compound into the injection mold to form an enclosure for the sensor element, the sensor element in the enclosure abutting both the molded part and the injection-molding compound, the molded part comprising a first part of an outer contour of the sensing device, and the injection-molding compound comprising a second part of the outer contour of the sensing device;
    wherein the sensor element is connected to a connection element via an interface;
    wherein the sensor element is inserted into the molded part so that the interface is in the molded part; and
    wherein the injection mold comprises a lower mold and an upper mold, the molded part being inserted into the lower mold.

12. The method of claim 11, wherein an injection point at which injection-molding compound is introduced into the injection mold is in the upper mold.

* * * * *